(12) United States Patent
Felix Moreno

(10) Patent No.: US 9,771,887 B2
(45) Date of Patent: Sep. 26, 2017

(54) SINGLE RAIL COMBINED FUEL INJECTION

(71) Applicant: Ford Global Technologies, LLC, Dearborn, MI (US)

(72) Inventor: Rodrigo Felix Moreno, Atizapan de Zaragoza (MX)

(73) Assignee: Ford Global Technologies, LLC, Dearborn, MI (US)

( * ) Notice: Subject to any disclaimer, the term of this patent is extended or adjusted under 35 U.S.C. 154(b) by 30 days.

(21) Appl. No.: 14/948,748

(22) Filed: Nov. 23, 2015

(65) Prior Publication Data

US 2017/0145944 A1    May 25, 2017

(51) Int. Cl.
*F02D 41/38* (2006.01)
*F02M 39/00* (2006.01)
*F02M 55/02* (2006.01)

(52) U.S. Cl.
CPC ....... *F02D 41/3836* (2013.01); *F02M 39/005* (2013.01); *F02M 55/025* (2013.01); *F02D 2041/389* (2013.01)

(58) Field of Classification Search
CPC .......... F02D 41/3836; F02D 2041/389; F02M 39/005; F02M 55/025
USPC ........................................................ 123/305
See application file for complete search history.

(56) References Cited

U.S. PATENT DOCUMENTS

| | | | |
|---|---|---|---|
| 4,782,810 A * | 11/1988 | Shimoda | F02D 41/0072 123/478 |
| 5,152,269 A | 10/1992 | Murphy | |
| 5,193,508 A | 3/1993 | Motoyama et al. | |
| 5,714,683 A | 2/1998 | Maloney | |
| 6,135,092 A * | 10/2000 | Schaenzer | F02M 55/04 123/456 |
| 7,293,552 B2 | 11/2007 | Leone et al. | |
| 7,395,786 B2 | 7/2008 | Leone et al. | |
| 7,412,966 B2 | 8/2008 | Lewis et al. | |
| 7,426,925 B2 | 9/2008 | Leone et al. | |
| 7,428,895 B2 | 9/2008 | Leone et al. | |
| 7,448,361 B1 * | 11/2008 | Pursifull | F02M 59/42 123/179.17 |
| 7,640,914 B2 | 1/2010 | Lewis et al. | |
| 7,647,916 B2 | 1/2010 | Leone et al. | |
| 7,721,710 B2 | 5/2010 | Leone et al. | |
| 7,913,668 B2 | 3/2011 | Lewis et al. | |
| 7,942,128 B2 | 5/2011 | Leone et al. | |

(Continued)

OTHER PUBLICATIONS

Pursifull, Ross Dykstra, "Method for Lift Pump Control," U.S. Appl. No. 14/558,482, filed Dec. 12, 2014, 53
Surnilla, Gopichandra et al., "Methods and Systems for Fixed and Variable Pressure Fuel Injection," U.S. Appl. No. 14/570,546, filed Dec. 15, 2014, 51 pages. pages.

(Continued)

*Primary Examiner* — Joseph Dallo
*Assistant Examiner* — Yi-Kai Wang
(74) *Attorney, Agent, or Firm* — Julia Voutyras; McCoy Russell LLP

(57) ABSTRACT

Methods and systems are provided for adjusting operation of an internal combustion engine configured for dual fuel injection from a single fuel rail. In one example, a method may include directing fuel from a common high pressure fuel rail to one or more of a direct injector and a port injector, wherein each of the direct injector and port injector may be coupled to a cylinder of an engine. The flow of fuel to the direct injector and port injector from the single fuel rail is mediated by a flow selection valve.

18 Claims, 7 Drawing Sheets

(56) References Cited

U.S. PATENT DOCUMENTS

| | | | |
|---|---|---|---|
| 8,132,555 B2 | 3/2012 | Lewis et al. | |
| 8,312,862 B2 | 11/2012 | Klesse et al. | |
| 8,393,312 B2 | 3/2013 | Lewis et al. | |
| 8,997,720 B2 | 4/2015 | Brown et al. | |
| 2007/0119416 A1* | 5/2007 | Boyarski | F02M 25/0228 123/304 |
| 2008/0017171 A1* | 1/2008 | Stein | F02D 19/12 123/478 |
| 2012/0210981 A1 | 8/2012 | Ulrey et al. | |
| 2013/0160742 A1 | 6/2013 | Brown et al. | |
| 2013/0245913 A1* | 9/2013 | Cowgill | F02D 13/0207 701/102 |
| 2014/0297159 A1* | 10/2014 | Surnilla | F02D 41/3094 701/103 |
| 2015/0107558 A1* | 4/2015 | Dugad | F02M 37/0052 123/469 |
| 2016/0084150 A1* | 3/2016 | Kawabe | F02D 41/3094 123/294 |
| 2016/0153354 A1* | 6/2016 | Nichols | F02M 43/00 123/294 |

OTHER PUBLICATIONS

Surnilla, Gopichandra et al., "Methods and Systems for High Pressure Port Fuel Injection," U.S. Appl. No. 14/570,802, filed Dec. 15, 2014, 32 pages.

Makled, Daniel A. et al., "Methods and Systems for Estimating Ambient Pressure Using an Oxygen Sensor," U.S. Appl. No. 14/997,309, filed Jan. 15, 2016, 49 pages.

Uhrich, Michael James et al., "Method and System for Exhaust Gas Heat Recovery," U.S. Appl. No. 15/010,382, filed Jan. 29, 2016, 70 pages.

Styles, Daniel Joseph et al., "Method and System for Exhaust Gas Heat Recovery," U.S. Appl. No. 15/010,537, filed Jan. 29, 2016, 72 pages.

Uhrich, Michael James et al., "Exhaust Heat Recovery and Hydrocarbon Trapping," U.S. Appl. No. 15/010,688, filed Jan. 29, 2016, 53 pages.

Sanborn, Ethan D., "Methods and Systems for Dual Fuel Injection," U.S. Appl. No. 15/098,144, filed Apr. 13, 2016, 48 pages.

Sanborn, Ethan D., "Methods and Systems for Dual Fuel Injection," U.S. Appl. No. 15/133,739, filed Apr. 20, 2016, 46 pages.

* cited by examiner

SINGLE RAIL COMBINED FUEL INJECTION

FIELD

The present description relates generally to methods and systems for adjusting operation of an internal combustion engine configured for dual fuel injection from a single fuel rail.

BACKGROUND/SUMMARY

Engines may be configured with various fuel systems used to deliver a desired amount of fuel to an engine for combustion. One type of fuel system includes a port fuel injector and a direct fuel injector for each engine cylinder. Only the port fuel injectors may be operated to improve fuel vaporization and reduce engine emissions, as well as to reduce pumping losses and fuel consumption at lower loads. Only the direct fuel injectors may be operated to improve engine performance and fuel consumption at higher loads. Additionally, both port fuel injectors and direct injectors may be operated together under some conditions to leverage advantages of both types of fuel delivery.

In engines configured with dual injection systems, that is engines enabled with both direct and port fuel injectors, pressurized fuel from the fuel tank may be supplied to both a direct injection high pressure fuel pump (HPFP) as well as a port injection fuel rail. However, a fuel pressure delivered to the port injector may need to be controlled to be different from (and lower than) a fuel pressure delivered to the direct injector. As such, if high pressure fuel is delivered via the port fuel injector, it may cause excess fuel deposition in the intake manifold and subsequent fuel loss due to vaporization.

Example attempts to address the issue of supplying fuel at different pressures to the port and direct injectors include the use of pressure regulators. One example approach is shown by Motoyama et al. in U.S. Pat. No. 5,193,508. Therein, a first fuel injector injects fuel directly into the combustion chamber while a second fuel injector injects fuel into the intake manifold of the engine. Fuel rails for each of the fuel injectors may receive high pressure fuel via a common pump. In addition, a plurality of pressure regulators may be incorporated in the fuel line for supplying the second fuel injector with fuel at a pressure lower than the pressure at which fuel is supplied to the first fuel injector.

However, the inventors herein have recognized potential issues with such systems. As one example, systems wherein port fuel injectors and direct injectors are used in tandem may have high component costs due to the need for distinct sets of components for each injector type. For example, Motoyama may use at least double the number of components including two fuel rails, two pressure regulators, two fuel line bundles, etc. In addition to increasing costs, the need for multiple components reduces packaging space availability around the already crowded engine space. Further still, the configuration makes routing of fuel lines more complicated as each fuel line has to optimized to feed an independent fuel injection system.

In one example, the issues described above may be addressed by a method for an engine comprising a common fuel distribution injector system. One example method includes directing fuel from a common high pressure fuel rail to one or more of a direct injector and a port injector, each of the direct injector and port injector coupled to a cylinder of an engine. In this way, a single pressurized fuel source and fuel feed line can be used to distribute fuel to each of a direct and a port injector.

As an example, a fuel distributing injector system in an engine may include a direct injector, a flow selection valve, and a high-to-low pressure regulator. The fuel distributing injector system may be configured to act as a direct injector as well as a low pressure fuel delivery unit for a port fuel injector. In particular, the fuel distributing injector system may be coupled to a port fuel injector, the port injector located external to the fuel distributing injector system. Fuel may be supplied at high pressure from a high pressure fuel rail to the flow selection valve of the fuel distributing injector system. The flow selection valve may then channel high pressure fuel into the housing of the direct injector. When port injection is required, fuel then be drawn from the direct injector housing, downstream of the fuel rail and upstream of an inlet of the direct injector into the port injector, via the pressure regulator. For example, the pressure regulator may be configured as a mechanical spill valve such that fuel delivered to the port injector downstream of the valve is regulated to a lower pressure than the pressure of fuel delivered to the direct injector upstream of the spill valve. In an alternate example, the flow selection valve may be an electronic valve configured to enable simultaneous fuel supply to both the direct injector (directly) and the port fuel injector (via the pressure regulator) based on engine operating conditions.

In this way, a single fuel distributing injector system may be used to deliver fuel at different pressures to each of the direct and port fuel injectors. The technical effect of using a fuel distributing system wherein higher pressure fuel is delivered into a direct injector housing and then drawn from the direct injector housing and delivered at a lower pressure to a port injector housing is that fuel may be delivered to each of the direct and port injector using a single fuel pump, a single fuel rail, a single fuel feed line, and a single pressure regulator. By reducing the number of parts required for dual fuel delivery, fuel systems costs may be reduced. In addition, the issue of overcrowding around the engine may be overcome.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
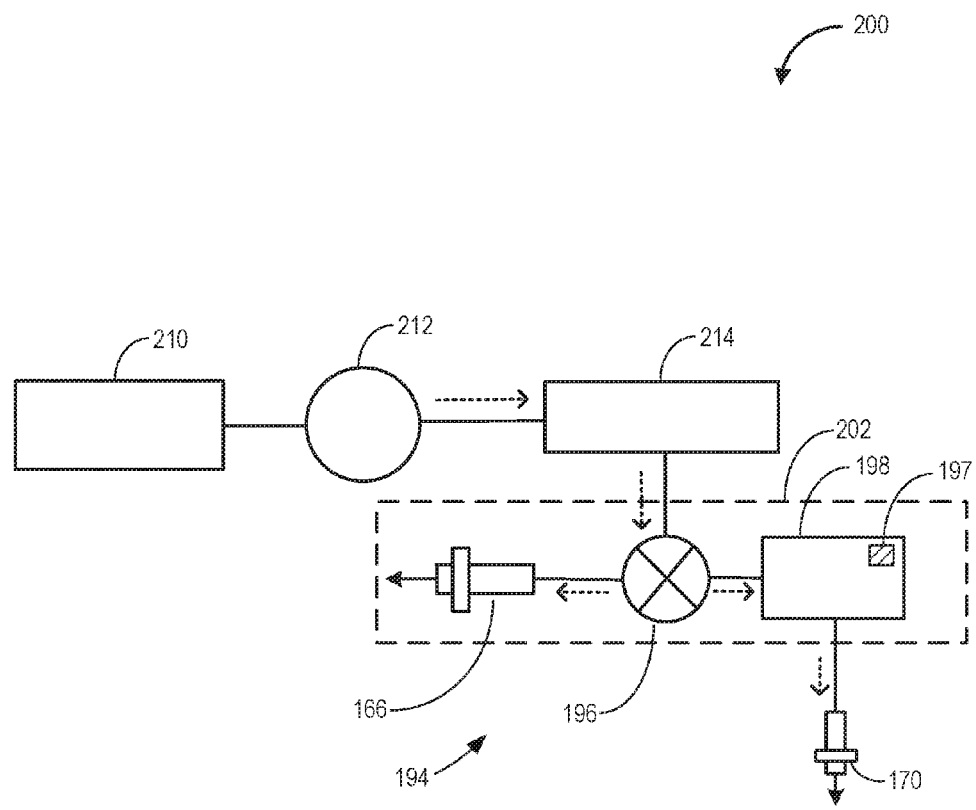
FIG. 2 schematically depicts an example embodiment of a fuel system configured for dual injection via a fuel distributing injector system that may be used with the engine of FIG. 1.
Figure 3:
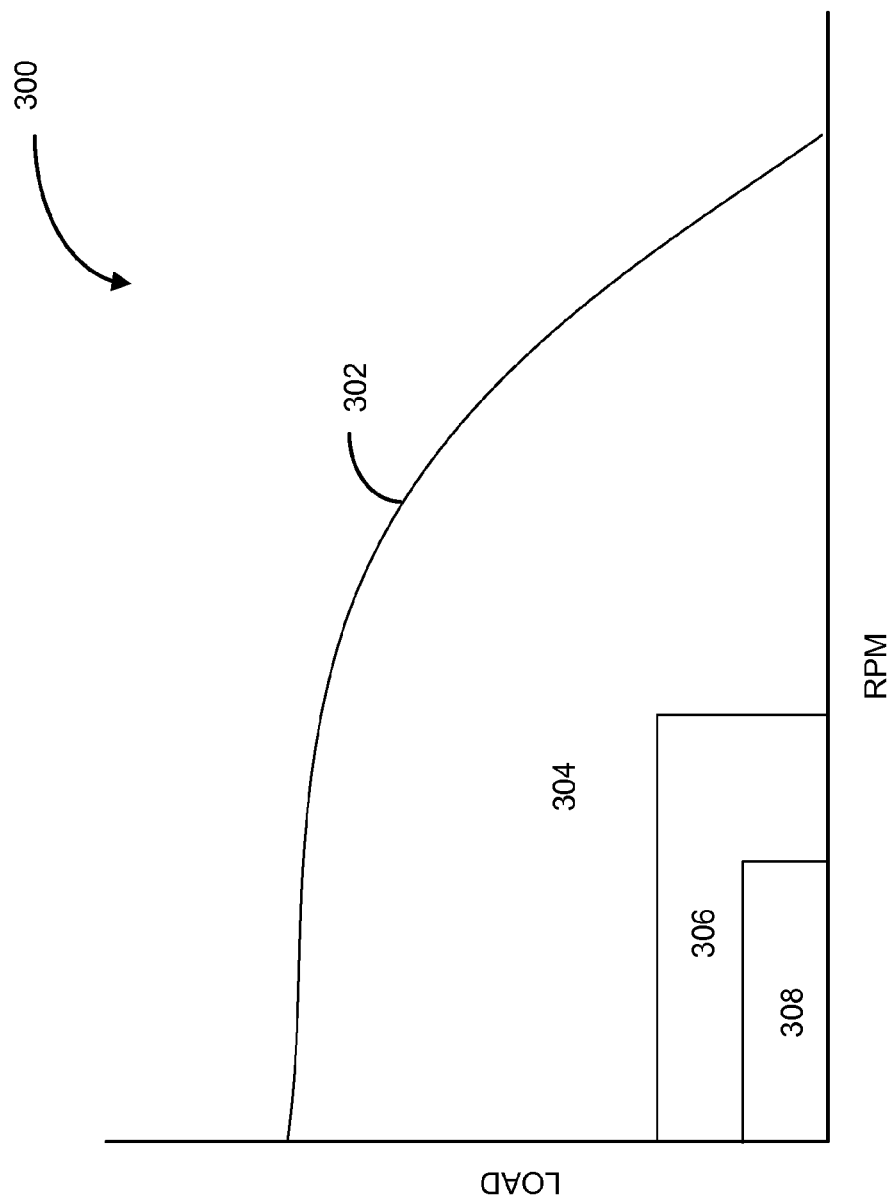
FIG. 3 depicts an example map of injection profiles selected based on engine operating conditions.
Figure 6:
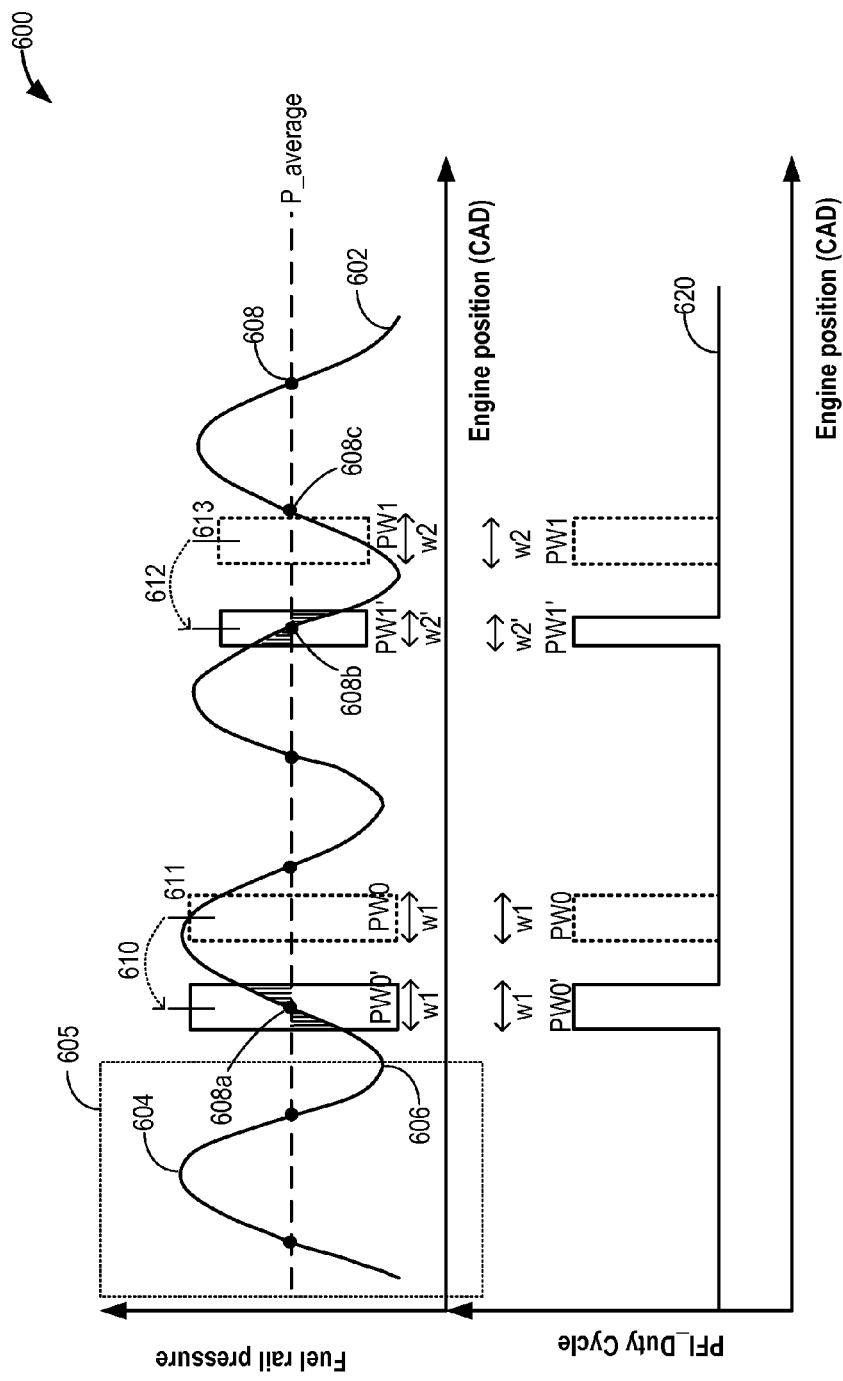
FIG. 6 depicts an example relationship between fuel pressure at a fuel rail pressure delivering fuel to each of a direct and a port fuel injector and fuel pressure at a high pressure fuel pump delivering fuel to the common fuel rail.
Figure 7:
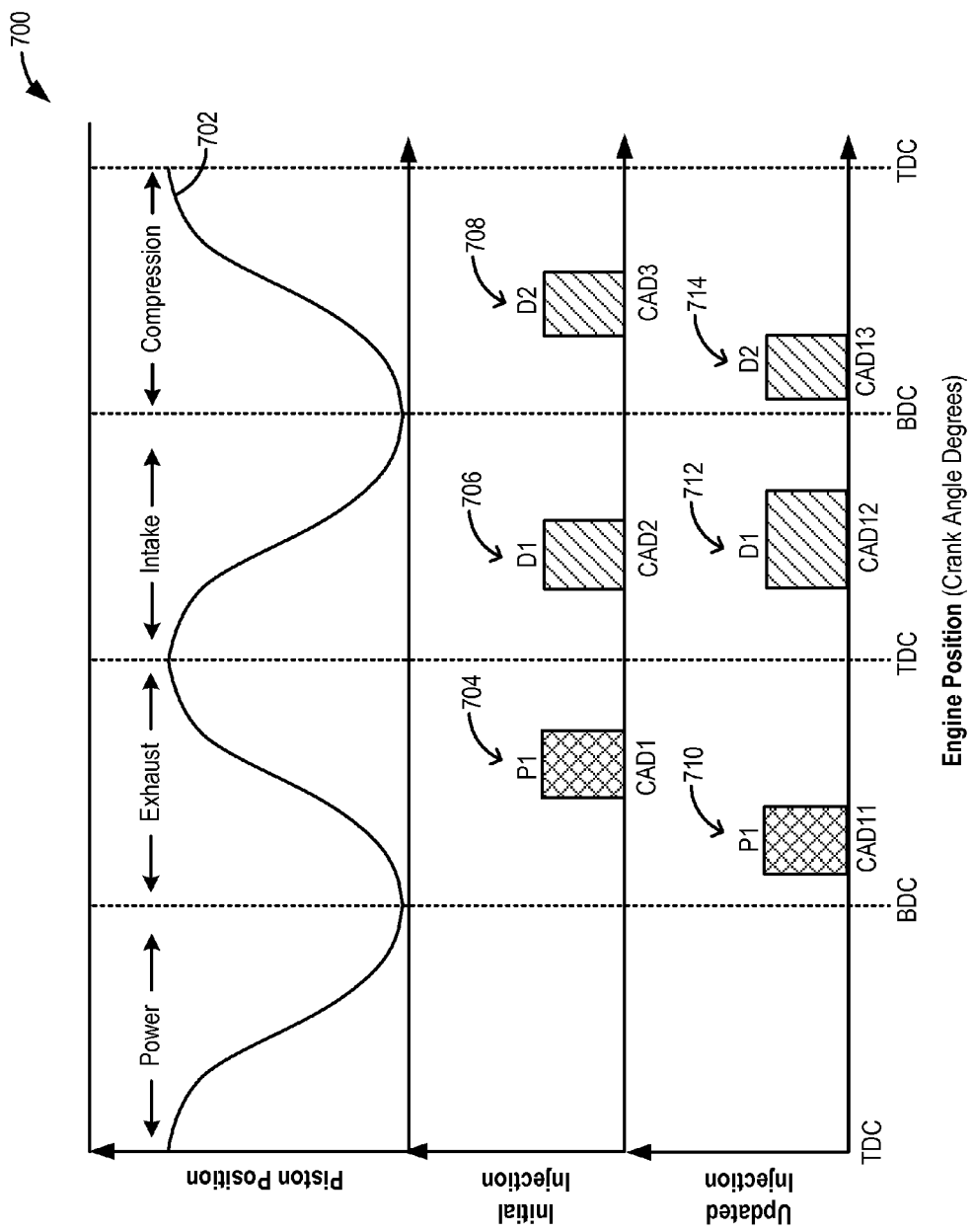
FIG. 7 shows fuel injection profiles for port and direct fuel injection into a cylinder from a common fuel rail via a fuel distributing injector system.

The following detailed description relates to methods and system for delivering fuel to a engine cylinder via a fuel distributing injector system that supplies fuel to both a direct injector and a port fuel injector. An example embodiment of a cylinder in an internal combustion engine is given in FIG. 1 while FIG. 2 depicts an example fuel system with a fuel distributing injector system that may be used with the engine of FIG. 1. A controller may be configured to perform a control routine, such as the example routine of FIG. 4, to adjust the delivery of fuel from the fuel distributing injector system to one or more of a direct and a port injector based on a determined fuel injection profile. The fuel injection profile is based on engine operating conditions, as depicted at the map of FIG. 3. The controller may also perform a control routine, such as the example routine of FIG. 5, to reposition a port injection fuel pulse so as to align a center of the fuel pulse with an average pressure crossing point and reposition a direct injection pulse based on a repositioned port fuel pulse timing. An example repositioning of a port fuel injection pulse is shown at FIG. 6. An example of initial and updated fuel injection profiles for both port injection and direct injection from a common fuel rail is shown at FIG. 7.

Regarding terminology used throughout this detailed description, port fuel injection may be abbreviated as PFI while direct injection may be abbreviated as DI. Also, port fuel injector may be abbreviated as PFI injector and direct injector may be abbreviated as DI injector. In addition, flow selection valve 196 may be abbreviated as FSV and high-to-low pressure regulator may be referred to as simply a pressure regulator.

Figure 1:
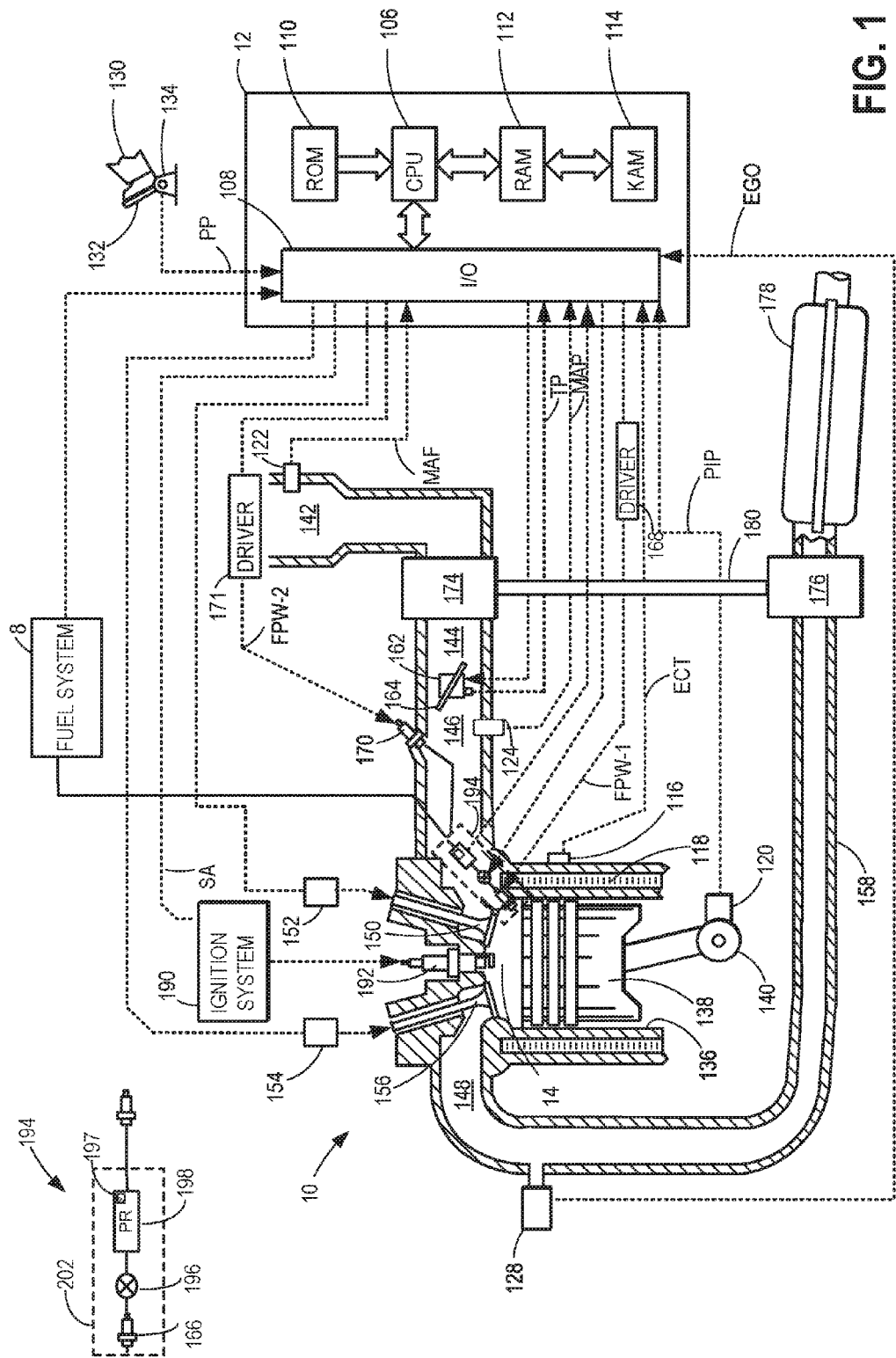
FIG. 1 schematically depicts an example embodiment of a cylinder of an internal combustion engine.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 provides what is known as direct injection (hereafter referred to as "DI") of fuel directly into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Fuel injector 166 injects fuel directly into cylinder 14 in proportion to the pulse width of signal FPW-1 received from controller 12 via electronic driver 168, as elaborated below.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171.

In particular, fuel may be directed from a high pressure rail directly into the cylinder via fuel distributing injector system 194 which includes direct fuel injector 166 together with a flow selection valve 196 and a high-to-low pressure regulator 198 (hereafter referred to as "pressure regulator 198") combined into a single unit (with common housing 202 schematically shown in FIG. 2). Fuel distributing injector system 194 is shown coupled directly to cylinder 14 for injecting fuel directly therein in proportion to the pulse width of signal FPW-1 received from controller 12 via electronic driver 168. Fuel may be delivered to fuel distributing injector 194 from high pressure fuel system 172 including a fuel tank, fuel pumps, a fuel rail, and driver 168. Further, while not shown, the fuel tank may have a pressure transducer providing a signal to controller 12. Additional details regarding duel distributing injector system 194 are provided with reference to FIG. 2.

Port injector 170 is fluidically coupled to fuel distributing injector system 194. However, port injector 170 is positioned external to the unit and not included within fuel distributing injector system 194. Specifically, port injector 170 may be coupled to, or downstream of, pressure regulator 198. Thus, there is no separate rail coupled to the port injector other than the high pressure fuel rail, and the both injectors receive fuel from the same fuel rail.

Fuel is pumped from a fuel tank into a common fuel rail from which fuel is delivered to each of the port injector and the direct injector via flow selection valve 196. In one example, where flow selection valve 196 is configured as an electrically actuated valve, the valve may operate in a first mode to channel high pressure fuel flow to the internal direct injector 166 or in a second mode to channel the high pressure fuel flow to the internal pressure regulator 198, from where fuel is directed to the port injector. Herein, the valve mode is selected by controller 12 based at least on relative timing of a direct fuel injection pulse relative to a port fuel injection pulse. In this example, FSV 196 may function in conjunction with pressure regulator 198 that is located downstream of the FSV 196 and upstream of the PFI injector 166. The pressure regulator 198 may include a pressure sensor 197 whose reading is sent to the controller 12. When direct injection of fuel is required by the engine, fuel flows to the DI injector 166 from the high pressure fuel rail via the FSV 196. When engine operation requires the use of port injection, the FSV 196 delivers fuel (via the pressure regulator 198) to the external port fuel injector 170 at a pressure lower than what is delivered to the direct injector. In one example, the FSV 196 delivers fuel to the direct injector at a pressure of 1000 Psi while delivering fuel to the port injector at a pressure 60 Psi. Thus, the fuel distributing injector system 194 acts as a DI injector as well as a low pressure fuel delivery unit for the port fuel injector 170.

In another example, where flow selection valve 196 is configured as a mechanical spill valve, fuel may be continuously delivered at a higher pressure from the valve to the direct injector, fuel injected from the direct injector into the cylinder by adjusting the opening of the direct injector nozzle. Further, fuel may also be continuously drawn from upstream of the valve into the port injector via the pressure regulator at a lower pressure. Fuel may then be injected from the port injector into the cylinder by adjusting the opening of the port injector nozzle. In this example, fuel is continuously supplied from the high pressure rail to the direct injector 166 via the flow selection valve 196. Further in this example, fuel may continuously flow from the direct injector 166 to the port injector 170 via the flow selection valve (or mechanical spill valve) 196, which regulates the fuel pressure and supplies it at a lower pressure to the port injector 170. When engine operating conditions demand either direct or port injection, the respective DI or PFI injector nozzles open and supply fuel to the combustion chamber. Owing to the continuous supply of fuel to the direct and port injectors, they may operate using a single fuel rail. In other words, the port fuel injector may function without the use of a separate port fuel rail.

In either configuration, fuel is directed at a higher pressure from the high pressure fuel rail to a pressure regulator via the flow selection valve, and then at a lower pressure from the pressure regulator to the port injector, the pressure regulator reducing a pressure of the fuel received from the high pressure fuel rail prior to fuel delivery to the port injector.

Fuel may be delivered by both injectors to the cylinder during a single cycle of the cylinder. For example, the flow selection valve may be first adjusted to a position based on PFI timing followed by adjustment to the valve position based on DI timing. For example, each injector may deliver a portion of a total fuel injection that is combusted in cylinder 14. Further, the distribution and/or relative amount of fuel delivered from each injector may vary with operating conditions, such as engine load and/or knock, such as described herein below. The relative distribution of the total injected fuel among injectors 166 and 170 may be referred to as a first injection ratio. For example, injecting a larger amount of the fuel for a combustion event via (port) injector 170 may be an example of a higher first ratio of port to direct injection, while injecting a larger amount of the fuel for a combustion event via (direct) injector 166 may be a lower first ratio of port to direct injection. Note that these are merely examples of different injection ratios, and various other injection ratios may be used. Additionally, it should be appreciated that port injected fuel may be delivered during an open intake valve event, closed intake valve event (e.g., substantially before an intake stroke, such as during an exhaust stroke), as well as during both open and closed intake valve operation. Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke, or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used.

As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. The controller 12 receives signals from the various sensors of FIG. 1 and employs the various actuators of FIG. 1 to adjust engine operation based on the received signals and instructions stored on a memory of the controller. As an example, the controller may send a signal to actuate an opening/position of flow selection valve 196 in response to fuel injection timing. Based on engine load and torque, if direct injection is requested, the controller may actuate flow selection valve 196 to a first position that channels high pressure fuel to DI injector 166. In another example, when port injection is requested, the controller may actuate the flow selection valve 196 to a second, different position to direct low pressure fuel, upon pressure regulation through pressure regulator 198, to port injector 170.

FIG. 2 schematically depicts an example embodiment 200 of a fuel system configured for dual injection via a fuel distributing injector system that may be used with the engine of FIG. 1. Fuel system 200 may be operated to deliver fuel to an engine, such as engine 10 of FIG. 1. Components previously introduced in FIG. 1 are numbered similarly in FIG. 2 and not re-introduced for reasons of brevity.

Fuel system 200 includes a fuel storage tank 210 for storing fuel on-board the vehicle, a high pressure fuel pump 212, and a common high pressure fuel rail 214. The fuel storage tank supplies fuel to each of the direct and port injectors of the fuel system. The high pressure fuel rail 214 receives fuel from the fuel tank via the high pressure fuel pump 212. Fuel system 200 further includes fuel distributing injector system 194, as previously introduced in FIG. 1. Fuel distributing injector system 194 includes direct injector 166, flow selection valve 196, and pressure regulator 198. A pressure sensor 197 may be coupled to pressure regulator 198 for estimating a pressure of fuel delivered to the direct and/or port injector. The flow selection valve 196 is fluidically coupled to each of the direct injector 166, the pressure regulator 198 and the high pressure fuel rail 214. Furthermore, the flow selection valve 196 is coupled downstream of the high pressure fuel rail 214 to direct fuel from the high pressure fuel rail 214 to one or more of the direct injector 166 and the port injector 170. High pressure fuel supplied by fuel pump 212 into common high pressure fuel rail 214 is then directed to flow selection valve 196 when the engine is in operation.

In one example, the flow selection valve 196 is electrically actuated to direct fuel either to the direct injector 166 or to the external port fuel injector 170 (via the pressure regulator 198). Further, when both port and direct injection is required, based on a signal received from the controller 12 indicative of the fuel injection pulse timing, fuel may be delivered to the direct and the port injector. For example, when the engine 10 is operating at high speed, the flow selection valve 196 may open to channel high pressure fuel to DI injector 166. In another example, when the engine 10 is operating at low speed, the flow selection valve 196 may open to direct fuel supply to pressure regulator 198, which may lower the pressure of the fuel prior to delivery. A pressure of the fuel delivered to the port injector may be estimated by pressure sensor 197, coupled to the pressure regulator 198. Controller 12 may determine when the fuel pressure desired for port injection is attained and may actuate an opening of the pressure regulator to supply low pressure fuel to PFI injector 170. When engine operating conditions require both direct and port injection (such as at mid-loads), the flow selection valve 196 may direct fuel to both the DI injector 166 as well as the PFI injector 170. Injection profiles (DI, PFI, or both) may be selected based on engine speed-load conditions, such as discussed with reference to the map of FIG. 3.

In another example, the flow selection valve 196 is mechanically actuated to continuously direct fuel received from high pressure fuel rail 214 to direct injector 166, the spill valve working to maintain a desired elevated fuel pressure at the direct injector. In addition, fuel above the desired pressure may be continuously spilled from downstream of the fuel rail and upstream of the direct injector into the (or towards the) port injector 170. An intermediate pressure regulator may regulate the pressure of the fuel received from the direct injector at the port injector. However, by having a high pressure fuel rail system that maintains a constant pressure in the fuel rail, the need for a spill valve and an associated return line to the fuel tank is reduced.

As a result of this configuration, an engine controller may supply fuel from a high pressure fuel rail to a direct injector along a fuel line, and then supply fuel drawn from the fuel line, upstream of the direct injector, to a port injector, each of the direct injector and port injector coupled to a given engine cylinder.

In this way, fuel is delivered from a fuel tank into a direct injector along a higher pressure fuel line coupled to a single fuel rail. Higher pressure fuel drawn from the direct injector is then supplied to the port injector along a lower pressure fuel line, the lower pressure fuel line an extension of the higher pressure fuel line with an intermediate pressure regulator. By using a common fuel line, fuel rail, and fuel pump to supply fuel to each of the port and direct injectors of a cylinder, component costs and packaging requirements may be reduced, without compromising the accuracy of fueling control.

FIG. 3 depicts an example map that may be referred to by an engine controller for determining whether to supply fuel to an engine via direct injection, port injection, or both. In the depicted example, the injection profile map is stored as a function of engine speed versus engine load. However, in alternate examples, the injection profile map may be saved as a function of one or more other engine operating parameters. In map 300, peak engine torque is represented by curve 302.

In first region 308 of the map, characterized by low speed-load conditions, or where engine torque output is limited, fuel may be injected into the engine using port fuel injection alone (100% PFI). By delivering fuel to an engine cylinder via port injection only during such conditions, fuel vaporization is improved allowing for enhanced air-fuel mixing. In addition, exhaust emissions are improved due to the lower particulate matter emissions of port fuel injections, particularly during engine starts. Further, port fuel injection may provide an improvement in fuel economy over direct injection at lower engine loads.

In third region 304 of the map, characterized by high engine speed-load conditions, fuel may be injected into the engine using direct fuel injection alone (100% DI). In this region, the peak torque attainable is represented by curve 302. Under these conditions, fuel may be injected into the engine using direct fuel injection only for improved charged cooling and for reducing knocking. This results in a further improvement in engine performance.

In second region 306 of the map, characterized by medium speed-load conditions, a combination of port and direct fuel injection may be used. The combination allows for reduced fuel loss by vaporization, as well as for improved emissions compliance. In this region, the ratio of fuel delivered as port injection relative to direct injection may be varied based on various engine conditions. For example, in mid speed-load conditions, the injection ratio may be varied while continuing to provide a relatively greater proportion of port fuel injection relative to direct fuel injection. As an example, in region 306, a ratio of 80% port fuel injection to 20% direct fuel injection may be used. Further, the ratio may skew towards even more port injection in areas of region 306 that border with region 308.

Figure 4:
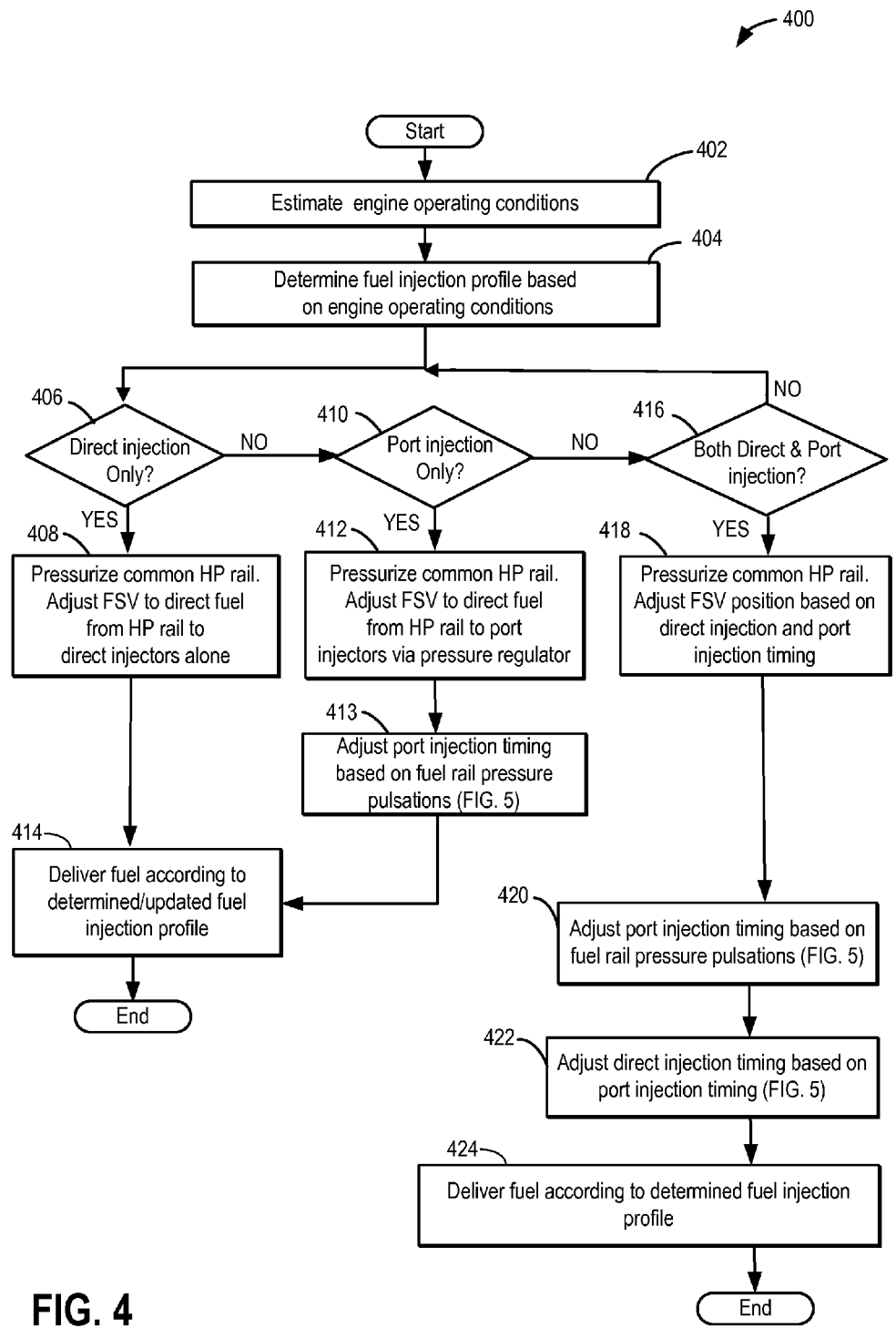
FIG. 4 shows a flow chart of an example method for adjusting delivery of fuel from a common high pressure rail to different fuel injectors via the fuel distributing injector system of FIGS. 1-2.

Turning now to FIG. 4, an example method 400 is shown for adjusting operation of a fuel distribution system for operating a fuel distributing injector system, such as system 194 of FIGS. 1-2, to enable higher pressure fuel to be supplied to a direct injector and lower pressure fuel to be supplied to a port injector along a common fuel line receiving fuel from a common pressurized fuel rail. Instructions for carrying out method 400 and the rest of the methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 402, the method includes estimating and/or measuring engine operating conditions. The estimated parameters may include, for example, engine speed, driver torque demand, fuel rail pressure, engine temperature, ambient conditions, etc. At 404, the method includes determining a fuel injection profile based on the estimated engine operating conditions. In one example, the fuel injection profile determined at 404 may be an initial fuel injection profile based on engine operating conditions, the profile subject to further adjustments later in the routine, as discussed below.

The determined fuel injection profile may include an amount of fuel to be delivered, a number of injections over which the fuel is to be delivered for a given combustion event, a timing of the injection(s), and further whether the fuel is to be delivered via direct injection, port injection, or both direct and port injection. For example, a desired total fuel mass to be delivered to a cylinder may be determined based on driver demand (or engine speed-load). Then, based on operating parameters such as engine temperature, exhaust particulate matter levels, exhaust catalyst temperature, etc., fuel pulses for port and/or direct injection may be calculated. The fuel injection profile may include details regarding whether the direct injection fuel amount is to be provided as a single injection, or as multiple split injections. If a split injection is desired, a ratio of total fuel in each of the split injections as well as a timing of each split injection may be determined. Likewise, the fuel injection profile may include details regarding whether the total fuel injection amount is to be split between a direct injection fuel amount and a port injection fuel amount, and further a ratio of the total fuel in each injection type.

In one example, the engine controller may refer an engine speed-load map, such as the example map of FIG. 3, to determine whether to deliver fuel via direct and/or port injection. As discussed with reference to FIG. 3, as one example, only port injection may be requested during low engine speed-load conditions as well as during engine starts, while only direct injection may be requested during high engine speed-load conditions. In the intermediate conditions, each of direct and port injection may be requested.

At 406, the method includes confirming that the determined fuel injection profile includes only direct injection of fuel. If only direct injection is requested, and the fuel injection profile includes only a direct injection fuel pulse, then at 408, the method includes pressurizing a common high pressure fuel rail via a high pressure fuel pump that is coupled to the engine and driven via the engine camshaft. Specifically, an output of the high pressure fuel pump may be adjusted to provide a target higher fuel rail pressure at the common high pressure fuel rail delivering fuel to the fuel distributing injector system.

In addition, in embodiments where the fuel selection valve (FSV) of the injector system is electrically actuated, a position of the FSV may be adjusted to enable fuel to be delivered from the high pressure fuel rail to the direct injector only. For example, the flow selection valve may be adjusted to a first position where the high pressure fuel rail is fluidically coupled to the direct injector but not fluidically coupled to a port injector or the pressure regulator of the fuel distributing injector system. In embodiments where the FSV is mechanically actuated, such as where the valve is a spill valve, pressurizing the fuel rail may result in higher pressure fuel automatically being supplied at the target higher pressure to the direct injector housing, and therein to the direct injector. The mechanical spill valve may have a predetermined pressure setting that automatically maintains the pressure of the fuel supplied into the direct injector at the target higher pressure.

Next, at 414, fuel is delivered according to the determined fuel injection profile. For example, fuel may be delivered at the higher pressure from the direct fuel injector in accordance with the size and timing of the direct injection fuel pulse of the determined fuel injection profile.

If only direct injection is not requested at 406, the method moves to 410 wherein the method includes confirming that the determined fuel injection profile includes only port injection of fuel. If only port injection is requested, and the fuel injection profile includes only a port injection fuel pulse, then at 412, the method includes pressurizing the common high pressure fuel rail via the high pressure fuel pump that is coupled to the engine and driven via the engine camshaft. Specifically, an output of the high pressure fuel pump may be adjusted to provide a target higher fuel rail pressure at the common high pressure fuel rail delivering fuel to the fuel distributing injector system. From there, fuel is supplied to the port injector at a target lower pressure. In embodiments where the fuel selection valve (FSV) of the injector system is electrically actuated, a position of the FSV may be adjusted to enable fuel to be delivered from the high pressure fuel rail to the port injector only. For example, the flow selection valve may be adjusted to a second position where the high pressure fuel rail is fluidically coupled to the port injector via the pressure regulator of the fuel distributing injector system, but not fluidically coupled to the direct injector. In embodiments where the FSV is mechanically actuated, such as where the valve is a spill valve, pressurizing the fuel rail may result in higher pressure fuel automatically being supplied at the target higher pressure to the direct injector housing, and therein to the direct injector, and then further from the direct injector into the port injector via the pressure regulator. The pressure regulator may have a predetermined pressure setting that automatically maintains the pressure of the fuel received in the port injector from the direct injector at a target lower pressure.

At 413, the method further includes adjusting a timing of the port injection fuel pulse in the initially determined fuel injection profile to reduce fueling errors resulting from changes in the fuel rail pressure. The changes are attributed to fuel pulsations from the high pressure fuel pump that may enter the common fuel rail. This is due to the sinusoidal fuel pressure generated at the high pressure fuel pump due to the pump being driven by the engine via a camshaft (and cam lobes). The pulsations can lead to larger discrepancies between the value of rested fuel in the port injector, or in the low pressure line supplying fuel from the direct injector to the port injector, as compared to value of fuel injected from the port injector fuel rail, resulting in large fueling errors. As elaborated with reference to FIG. 5, an engine controller may estimate a timing and position of zero-crossing of the fuel pressure waveform and move the port injection pulse to a closest zero-crossing in the advanced direction to reduce fueling errors due to fuel pump induced pressure fluctuations.

After updating the port injection fuel pulse timing in the initial fuel injection profile, the method moves to 414 wherein fuel is delivered according to the updated fuel injection profile. For example, fuel may be delivered at the lower pressure from the port fuel injector in accordance with the size and timing of the port injection fuel pulse of the updated fuel injection profile.

If only direct injection or only port injection fueling is not confirmed, at 416, the method includes confirming that each of port and direct injection has been requested. Upon confirmation, to provide fuel to both direct and port injectors, the routine includes pressurizing fuel in the common high pressure fuel rail via the camshaft-driven high pressure fuel pump. Specifically, an output of the high pressure fuel pump is adjusted to provide the desired fuel rail pressure at common high pressure fuel rail at 418. In embodiments where the fuel selection valve (FSV) of the injector system is electrically actuated, a position of the FSV may be adjusted to enable fuel to be delivered from the common high pressure fuel rail to the port injector at a timing corresponding to the PFI fuel pulse and then readjusted to enable fuel to be delivered to the direct injector at a timing corresponding to the DI fuel pulse injector only. For example, the flow selection valve may be initially adjusted to the second position where the high pressure fuel rail is fluidically coupled to the port injector to enable closed intake valve port injection (e.g., on an exhaust stroke), the valve then adjusted to the first position where the high pressure fuel rail is fluidically coupled to the direct injector to enable intake stroke and/or compression stroke direct injection. In embodiments where the FSV is mechanically actuated, such as where the valve is a spill valve, pressurizing the fuel rail may result in higher pressure fuel automatically being supplied at the target higher pressure to the direct injector housing, and therein to the direct injector, and then further from the direct injector into the port injector at the lower pressure via the pressure regulator. Fuel is then released from the high pressure line downstream of the fuel rail via the direct injector when the direct injector nozzle opens while fuel is released from the low pressure line downstream of the fuel rail via the port injector when the port injector nozzle opens. Herein, each of the port and direct injector is already primed with fuel at the right pressure, the fuel released when the corresponding nozzle opens.

At 420, the method further includes adjusting a timing of the port injection fuel pulse in the initially determined fuel injection profile, the adjusting performed so as to reduce fueling errors resulting from changes in the fuel rail pressure. The changes are attributed to fuel pulsations from the high pressure fuel pump that may enter the common fuel rail. This is due to the sinusoidal fuel pressure generated at the high pressure fuel pump due to the pump being driven by the engine via a camshaft (and cam lobes). The pulsations can lead to larger discrepancies between the value of rested fuel in the port injector as compared to value of fuel injected from the port injector fuel rail, resulting in large fueling errors. As elaborated with reference to FIG. 5, an engine controller may estimate a timing and position of zero-crossing of the fuel pressure waveform and move the port injection pulse to a closest zero-crossing in the advanced direction to reduce fueling errors due to fuel pump induced pressure fluctuations.

From there the method moves to 422 wherein a timing of the DI fuel pulse is adjusted based on the change in timing of the PFI fuel pulse. The initial fuel injection profile is accordingly updated. As also elaborated with reference to FIG. 5, the DI fuel pulse may be adjusted to compensate for any fueling or air-fuel ratio errors resulting from the change in PFI fuel pulse timing.

The method then moves to 424 wherein fuel is delivered according to the updated fuel injection profile. For example, fuel received from the common fuel rail may be delivered at the lower pressure from the port fuel injector in accordance with the size and timing of the port injection fuel pulse of the updated fuel injection profile. Likewise, fuel received from the common fuel rail may be delivered at the higher pressure from the direct fuel injector in accordance with the size and timing of the direct injection fuel pulse of the updated fuel injection profile.

Figure 5:
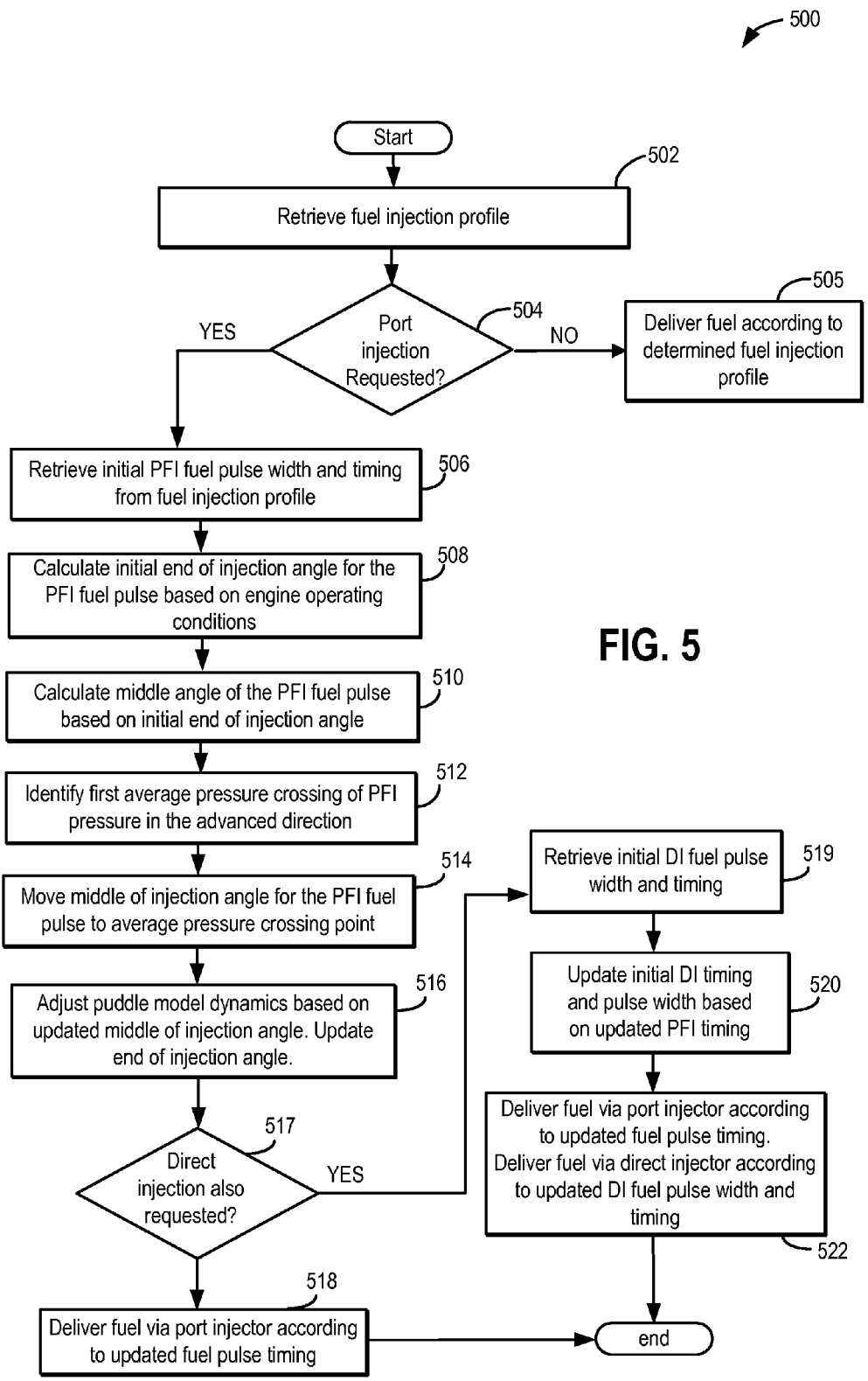
FIG. 5 shows a flow chart of an example method for adjusting a timing of a port fuel injection pulse and a direct injection fuel pulse while delivering fuel via the fuel distributing injector system.

Turning now to FIG. 5, at 502, a previously determined fuel injection profile is retrieved from the controller's memory. For example, the fuel injection profile previously determined at FIG. 4 may be retrieved.

At 504, it may be confirmed that port injection was requested. If at least some port injection was requested, the method proceeds to 506. If no port injection is requested, and only direct injection (DI) is requested, the method moves to 505 wherein fuel is delivered via the direct injector according to the determined fuel injection profile (as elaborated at FIG. 4).

If at least some port fuel injection (PFI) was requested at 504, the routine includes retrieving the initial PFI fuel pulse width and timing from the fuel injection profile. As such, at least some port injection includes conditions where only port fuel injection is requested as well as conditions where port and direct fuel injection are both requested.

At 508, the method includes calculating an initial end of injection angle for the PFI fuel pulse based on the fuel pulse width and the desired timing. In one example, the initial timing may correspond to a timing that allows for closed intake valve injection of the determined fuel mass. The initial timing may correspond to an engine position and may include a defined number of crank angle degrees. At 510, the method includes calculating a middle of injection angle for the PFI fuel pulse based on the initial end of injection angle timing and the fuel pulse width.

As such, the initial timing corresponding to closed intake valve injection may occur at any position of the pressure waveform of the common fuel rail, such as at or near a local maxima or a local minima. However, such locations may result in pressure fluctuations and thereby fueling errors. As elaborated herein, the controller may be configured to adjust the delivery of the port injection fuel pulse to deliver the port fuel injection with an updated timing that is balanced around an average pressure-crossing of the estimated fuel rail pressure. This allows fueling errors to be reduced.

Specifically, at 512, the method includes identifying a nearest average pressure crossing of fuel rail pressure in the advanced direction. The average pressure-crossing may include an average pressure between a local maxima and a local minima (for a cycle of the pressure waveform) of the fuel rail pressure. In other words, for a sinusoidal pressure waveform, the average pressure-crossing may correspond to a timing where above-average pressure is cancelled by under-average pressure. The average pressure-crossing timing may be with reference to an engine position and may include a defined number of engine crank angle degrees. In one example, the average pressure-crossing includes a zero-crossing of fuel pressure. As such, for every cycle of the waveform, there are two average pressure-crossings (or zero-crossings). The controller may identify and select a first average pressure-crossing in the advanced direction even if a second average pressure-crossing in the retarded direction is closer. By selecting the first average pressure-crossing in the advanced direction, closed intake valve port injection of fuel can be maintained.

At 514, the method includes moving delivery of the port fuel injection pulse from the initial timing corresponding to closed intake valve injection to the first average pressure crossing in the advanced direction. In other words, delivery of the port fuel injection pulse is not moved to a second average pressure crossing in the retarded direction, even if a distance between the initial timing and the second average pressure crossing is smaller than the distance between the initial timing and the first average pressure crossing. The moving specifically includes aligning the middle of injection angle of the port injection fuel pulse (as determined for the initial timing) with the first average pressure crossing in the advanced direction.

At 516, the method includes adjusting intake port fuel puddle model dynamics based on the moving. In one example, due to the advancing of the timing, the adjusting may be performed to account for increased vaporization of fuel in the intake port due to a longer duration of the intake port fuel puddle sitting on the intake valve or on valve walls. Accordingly, the adjusting may include updating the fuel pulse width and moving an end of injection angle of the port injection fuel pulse based on the aligning of the middle of injection angle and the adjusted intake port fuel puddle model dynamics. As an example, to account for the increased vaporization of fuel in the intake port, the fuel pulse width may be shortened by maintaining the middle of injection angle at the average pressure-crossing while advancing the end of injection angle. A trimming factor may be determined based on the updated fuel pulse width relative to the initial fuel pulse width (as retrieved at 506), and the trimming factor may be applied to the end of injection angle.

It will be appreciated that delivering the port fuel injection with a timing balanced around an average pressure-crossing of fuel rail pressure may include injecting each fuel injection pulse in a selected engine speed-load region with the timing balanced around the average pressure-crossing, while injecting each fuel injection pulse outside the selected engine speed-load region with a timing based on intake valve opening. Herein, the timing based on intake valve opening may include a timing offset from the average pressure-crossing (e.g., offset from the average pressure-crossing and towards the local maxima or a local minima of a cycle of the pressure waveform).

After adjusting the port injection fuel pulse timing, the method moves to 517 wherein it is determined if direct injection was also requested. If direct injection is also requested, the DI fuel pulse may need to be adjusted to compensate for any fueling errors or air-fuel ratio errors resulting from the change in PFI fuel pulse. If direct injection is not requested, then at 518, the method includes delivering fuel via the port injector according to the updated PFI pulse profile.

If direct injection is also requested, then at 519, the method includes retrieving the pulse width and timing of the DI fuel pulse as determined at 502. At 520, the method includes adjusting or updating the DI fuel pulse based on the change in PFI fuel pulse width and/or timing. In particular, when port injection is requested, fuel is drawn from the high pressure fuel line feeding into the direct injector and supplied to the low pressure fuel line feeding into the port injector, via the pressure regulator. As a result of the drawing of fuel from the direct injector's inlet into the port injector, there may be local pressure changes experienced at the direct injector, that can in turn result in fueling errors. Thus to preempt any fuel errors that can arise from the drawing of fuel from the direct injector's inlet for delivering to a port injector, a timing and pulse width of the DI fuel pulse may be correspondingly adjusted based on the moving of the port injection fuel pulse. In one example, in response to a movement of the PFI fuel pulse in the advanced direction, there may be small drop in the pressure at the inlet of the direct injector which is compensated for by extending the DI pulse width, such as by retarding an end of injection timing of the DI fuel pulse. In another example, the DI pulse may be compensated by splitting the DI fuel pulse into multiple injections including at least a compression stroke injection. In another example, the adjusting of the direct injection fuel pulse includes one or more of extending an end of injection timing of the direct injection fuel pulse and increasing an amount of direct injected fuel delivered in an intake stroke relative to a compression stroke. By delivering at least a portion of the DI pulse later in the engine cycle (e.g., moved from the intake stroke towards the compression stroke), the effect of the pressure variations at the DI due to the PFI pulse adjustment can be reduced.

After adjusting the DI pulse, at 522, the method includes delivering fuel to the engine cylinder via the port injector according to the updated PFI fuel pulse profile and to the cylinder via the direct injector according to the updated DI fuel pulse profile.

In this way, fueling errors induced at the port injector by pressure fluctuations at the fuel rail are reduced. In addition, fueling errors induced at the direct injector due to withdrawing of fuel therefrom to a port injector are reduced.

An example adjustment of a PFI fuel pulse based on an average pressure-crossing of fuel rail pressure is now discussed with reference to FIG. 6.

Map 600 of FIG. 6 depicts the fuel rail pressure at a common fuel rail delivering fuel to each of a port and a direct injector at plot 602. Map 600 further depicts and a port fuel injector duty cycle (PFI_DutyCycle) at plot 620. All plots are shown over time, depicted herein in terms of engine position in crank angle degrees (CAD).

As shown by the sinusoidal waveform of plot 602, the fuel rail pressure may periodically fluctuate between a local maxima 604 and a local minima 606. A statistical average of the local maxima and the local minima is determined as the average pressure (P_average), shown here as a dashed line. The average pressure-crossings (herein also referred to as zero-crossings) of the common fuel rail pressure, representing positions of the waveform that overlap with the average pressure, are represented by solid dots 608. As such, for each waveform cycle 605 (from one local minima to a subsequent local minima, as depicted, or from one local maxima to a subsequent local maxima), there may be two average pressure crossings 608 including one average pressure crossing on the ascending limb of the waveform (also referred to herein as an upward average pressure-crossing or upward zero-crossing) and one average pressure crossing on the descending limb of the waveform (also referred to herein as an downward average pressure-crossing or downward zero-crossing). It will be appreciated that while the waveform of FIG. 6 shows symmetric waves of equal intensity and a fixed frequency, in alternate examples, the waveform may be asymmetric such that the local maxima, minima, and average pressures for the waveform of each cycle are different from those of another cycle.

In the depicted example, a first port injection fuel pulse PW0 is determined initially for port injection of fuel in a first cylinder, and a second port injection fuel pulse PW1 is determined initially for port injection of fuel in a second cylinder, the second cylinder firing immediately after the first cylinder. First fuel pulse PW0 may have an initial pulse width w1 and an initial timing 611 corresponding to a position at or around the local maxima. Second fuel pulse PW1 may have an initial pulse width w2 and an initial timing 613 corresponding to a position at or around the local minima.

To reduce fueling errors induced by the sinusoidal fuel rail pressure change, the duty cycle of the first port injection fuel pulse PW0 is adjusted to move the timing to be balanced around a first average pressure-crossing in the advanced direction relative to initial timing 611. Specifically, a middle of injection angle of first fuel pulse PW0 is moved from initial timing 611 and repositioned to be aligned with a first average pressure-crossing 608a in the advanced direction. Herein, the first average pressure-crossing in the advanced direction is an upward pressure-crossing. Thus, initial first fuel pulse PW0 (dotted line) is repositioned, as shown by arrow 610, to updated first fuel pulse PW0' (solid line). As a result of the repositioning, fueling errors caused by over-average pressure estimation can be cancelled by fueling errors caused by under average-pressure estimation (as shown by straight lines in PW0' that are centered around

608*a*). The repositioning is performed without the need for additional adjustments to the fuel pulse width. Thus, after the repositioning, updated first fuel pulse PW0' has the same pulse width w1 as initial first fuel pulse PW0.

Also to reduce fueling errors induced by the sinusoidal fuel pressure change, the duty cycle of the second port injection fuel pulse PW1 is adjusted to move the timing to be balanced around a first average pressure-crossing in the advanced direction relative to initial timing 613. Specifically, a middle of injection angle of second fuel pulse PW1 is moved from initial timing 613 and repositioned to be aligned with a first average pressure-crossing 608*b* in the advanced direction. Herein, the first average pressure-crossing 608*b* in the advanced direction is a downward pressure-crossing. Herein, even though the initial timing 613 is significantly closer to second (upward) average pressure-crossing 608*c*, due to second average pressure-crossing 608*c* being in a retarded direction relative to initial timing 613, it is not selected. This allows closed intake valve port injection of fuel to be maintained. Instead, initial second fuel pulse PW1 (dotted line) is repositioned, as shown by arrow 612, to updated second fuel pulse PW1' (solid line). As a result of the repositioning, fueling errors caused by over-average pressure estimation can be cancelled by fueling errors caused by under average-pressure estimation (as shown by straight lines in PW1' that are centered around 608*b*). The repositioning is performed with the need for additional adjustments to the fuel pulse width. Specifically, to compensate for the additional duration that the fuel sits at or near the closed intake valve, and the resultant increase in fuel vapor generation, after the repositioning, updated second fuel pulse PW1' has a smaller pulse width w2' as compared to the pulse width w2 of initial second fuel pulse PW1. Herein, this is achieved by aligning the middle of injection angle of PW1 with average-pressure crossing 608*b* and then advancing the end of injection angle of PW1' towards average-pressure crossing 608*b*.

Turning now to FIG. 7, example adjustments to each of a port and a direct injection pulse to compensate for fuel rail pressure fluctuations is shown. Herein, each of the port and the direct injector are configured to receive fuel from a common fuel rail, with fuel being delivered from the fuel rail to the direct injector, and then from the direct injector to the port injector via a pressure regulator to reduce component requirements of the fuel system.

Map 700 illustrates an engine position along the x-axis in crank angle degrees (CAD). Curve 702 depicts piston positions (along the y-axis), with reference to their location from top dead center (TDC) and/or bottom dead center (BDC), and further with reference to their location within the four strokes (intake, compression, power and exhaust) of an engine cycle. As indicated by sinusoidal curve 702, a piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke.

The second plot (from the top) of map 700 depicts an example initial fuel injection profile 720 that is determined based on engine operating conditions. The fuel injection profile includes each of a PFI fuel pulse 704 (hatched block) and DI fuel pulses 706, 708 (diagonally striped blocks).

Specifically in this example, an engine controller is configured to provide the total amount of fuel to the cylinder as a first port injection P1 depicted at 704 (hatched block), a first intake stroke direct injection D1 depicted at 706 (diagonally striped block), and a second compression stroke direct injection D2 depicted at 708 (diagonally striped block). Port injection 704 is delivered at a first timing CAD1 during a closed intake valve event (that is, during the exhaust stroke). Then, a remaining portion of the fuel is direct injected over multiple injections. In particular, the first direct injection is delivered in the intake stroke at CAD2 while the second direct injection is delivered in the compression stroke at CAD3.

The second plot (from the top) of map 700 depicts an example updated fuel injection profile 730. The updated profile is modified from initial profile 720 to compensate for fuel rail pressure pulsations that affect the port injection, and port injection adjustments that affect the direct injection. Updated fuel injection profile 730 includes each of a PFI fuel pulse 710 (hatched block) and DI fuel pulses 712, 714 (diagonally striped blocks).

Specifically, in this example, an engine controller is configured to advance a timing of the first port injection P1 while maintaining the amount of fuel delivered in the injection. The port injection timing is advanced from CAD1 to CAD11, wherein CAD11 corresponds to a first zero-pressure crossing in an advanced direction. By advancing the port injection timing from CAD1 to CAD11, fueling errors in P1 incurred due to fuel rail pressure pulsations are reduced.

Also, in response to the adjustment of P1, the timing and amounts of D1 and D2 are also adjusted. Specifically, the port injection is provided by drawing fuel from a direct injector unit, the direct injector receiving fuel from the fuel rail. Due to the withdrawing of fuel from the direct injector unit, there may be pressure changes incurred at the direct injector which can translate into fueling errors. Thus, to reduce fueling errors in D1 and D2, the injection of D1 is extended by extending the end of injection timing. This results in an average injection timing of D1 being retarded from CAD2 to CAD12. In addition, the amount of fuel injected in injection 712 is more than the amount of fuel injected in injection 706. Further, to maintain the total amount of fuel provided by direct injection, as the amount of fuel injected in the intake stroke direct injection 712 is increased, the amount of fuel injected in the compression stroke direct injection 714 is decreased. In addition, the timing of injection D2 is advanced from CAD3 to CAD13.

One example method comprises supplying fuel from a high pressure fuel rail to a direct injector along a fuel line; and supplying fuel drawn from the fuel line, upstream of the direct injector, to a port injector, each of the direct injector and port injector coupled to an engine cylinder. The preceding example method additionally or optionally further comprises, lowering a pressure of the fuel drawn from upstream of the direct injector at a pressure regulator before supplying the fuel to the port injector. In any or all of the preceding examples, additionally or optionally, fuel is supplied from the high pressure fuel rail to the direct injector via a flow selection valve. In any or all of the preceding examples, additionally or optionally, each of the direct injector, the pressure regulator, and the flow selection valve are located in a common housing coupled to the high pressure fuel rail, and wherein the port injector is located external to the common housing. In any or all of the preceding examples, additionally or optionally, delivering fuel to the port injector further includes directing fuel at higher pressure from the high pressure fuel rail to a pressure regulator via the flow selection valve, and then directing fuel at a lower pressure from the pressure regulator to the port injector. In any or all of the preceding examples, additionally or optionally, the flow selection valve is a mechanical spill valve, wherein a pressure of fuel delivered from the high pressure fuel rail to the direct injector is based on a pressure setting of the flow selection valve. In any or all of the preceding examples, additionally or optionally, the flow selection valve is an electrically actuated valve and wherein supplying fuel to the direct injector includes moving the valve to a first position, and wherein delivering fuel to the port injector includes moving the valve to a second, different position. In any or all of the preceding examples, additionally or optionally, supplying fuel to the port injector includes moving delivery of a port injection fuel pulse from an initial timing corresponding to closed intake valve injection to a first average pressure crossing in an advanced direction, the first average pressure crossing including a zero pressure crossing. In any or all of the preceding examples, additionally or optionally, supplying fuel to the direct injector includes adjusting a direct injection fuel pulse based on the moving of the port injection fuel pulse. In any or all of the preceding examples, additionally or optionally, adjusting the direct injection fuel pulse includes one or more of extending an end of injection timing of the direct injection fuel pulse and increasing an amount of direct injected fuel delivered in an intake stroke relative to a compression stroke.

Another example method for an engine comprises: drawing fuel from a direct injector housing, downstream of a high pressure fuel rail; and delivering the drawn fuel to a port injector positioned external to the direct injector housing. The preceding example, additionally or optionally, further comprises delivering fuel from the high pressure fuel rail to the direct injector housing via a higher pressure fuel line, the high pressure rail receiving fuel from an engine driven high pressure displacement pump. In any or all of the preceding examples, additionally or optionally, the direct injector housing includes a pressure regulator and a direct fuel injector, and wherein fuel is delivered from the direct injector housing to the port injector via a lower pressure fuel line, the lower pressure fuel line coupled to the higher pressure fuel line via the pressure regulator. In any or all of the preceding examples, additionally or optionally, direct injector housing includes a mechanical spill valve and a direct fuel injector, and wherein fuel is delivered from the direct injector housing to the port injector via a lower pressure fuel line, the lower pressure fuel line coupled to the higher pressure fuel line via the mechanical valve. In any or all of the preceding examples, additionally or optionally, delivering the drawn fuel includes moving delivery of a port injection fuel pulse from an initial timing corresponding to closed intake valve injection to a first average pressure crossing in an advanced direction, the first average pressure crossing including a zero pressure crossing. Any or all of the preceding examples, additionally or optionally, further comprises in response to the port injection fuel pulse, adjusting a direct injection fuel pulse by one or more of extending an end of injection timing of the direct injection fuel pulse, increasing an amount of direct injected fuel delivered in an intake stroke relative to a compression stroke, and retarding a timing of fuel delivered via the direct injector in the compression stroke.

Another example system comprises an engine with a cylinder; a high pressure fuel rail receiving fuel from an engine-driven high pressure fuel pump; a fuel distributing injection system (FDI) including each of a direct injector, a flow selection valve, and a pressure regulator located within a common housing, the direct injector configured to inject fuel directly into the cylinder; and a port injector configured to inject fuel into an intake port of the cylinder, the port injector receiving fuel from the high pressure fuel rail via the fuel distributing injection system, the port injector positioned external to the common housing. In the preceding example, additionally or optionally, the pressure regulator reduces a pressure of fuel received from the high pressure fuel rail before supplying the fuel to the port injector. In any or all of the preceding examples, additionally or optionally, the system further comprises a controller configured with computer-readable instructions stored on non-transitory memory for: in response to a port injection fuel pulse command, adjusting a position of the flow control valve to direct fuel from downstream of the high pressure fuel rail and upstream of the direct injector to the port injector via the pressure regulator. In any or all of the preceding examples, additionally or optionally, the controller includes further instructions for: in response to the port injection fuel pulse command, moving a port injection timing from an initial injection timing corresponding to closed intake valve injection to a first zero-crossing of pressure in the high pressure fuel rail; and in response to a further direct injection fuel pulse command, adjusting a timing and split ratio of fuel delivered via direct injection in the intake stroke relative to a compression stroke, the adjusting based on the moving of the port injection timing.

In this way, a fuel distributing injector unit receiving fuel from a single high pressure fuel rail is used to supply fuel to both direct and port injectors reducing the need for dedicated fuel lines and components. The technical effect of drawing high pressure fuel from upstream of a direct injector inlet and supplying the fuel to a port injector inlet (wherein the port injector is positioned external to the direct injector housing) is that fuel can be delivered to both injectors along the same fuel line. This allows fuel system manufacturing costs to be reduced while improving packaging of the fuel system components in the tight space available around the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    supplying fuel from a high pressure fuel rail to a direct injector along a fuel line;
    supplying fuel drawn from the fuel line, upstream of the direct injector, to a port injector, each of the direct injector and port injector coupled to an engine cylinder; and
    lowering a pressure of the fuel drawn from upstream of the direct injector at a pressure regulator before supplying the fuel to the port injector,
    wherein fuel is supplied from the high pressure rail to the direct injector via a flow selection valve, wherein there is no separate rail coupled to the port injector other than the high pressure fuel rail.

2. The method of claim 1, wherein each of the direct injector, the pressure regulator, and the flow selection valve are located in a common housing coupled to the high pressure fuel rail, and wherein the port injector is located external to the common housing.

3. The method of claim 2, wherein delivering fuel to the port injector further includes directing fuel at higher pressure from the high pressure fuel rail to a pressure regulator via the flow selection valve, and then directing fuel at a lower pressure from the pressure regulator to the port injector.

4. The method of claim 1, wherein the flow selection valve is a mechanical spill valve, wherein a pressure of fuel delivered from the high pressure fuel rail to the direct injector is based on a pressure setting of the flow selection valve.

5. The method of claim 1, wherein the flow selection valve is an electrically actuated valve and wherein supplying fuel to the direct injector includes moving the valve to a first position, and wherein delivering fuel to the port injector includes moving the valve to a second, different position.

6. The method of claim 1, wherein supplying fuel to the port injector includes moving delivery of a port injection fuel pulse from an initial timing corresponding to closed intake valve injection to a first average pressure crossing in an advanced direction, the first average pressure crossing including a zero pressure crossing.

7. The method of claim 6, wherein supplying fuel to the direct injector includes adjusting a direct injection fuel pulse based on the moving of the port injection fuel pulse.

8. The method of claim 7, wherein adjusting the direct injection fuel pulse includes one or more of extending an end of injection timing of the direct injection fuel pulse and increasing an amount of direct injected fuel delivered in an intake stroke relative to a compression stroke.

9. A method for an engine, comprising:
    drawing fuel from a housing in which a direct injector, a pressure regulator, and a flow selection valve are located, the housing arranged downstream of a high pressure fuel rail, and the high pressure fuel rail arranged downstream of a fuel pump; and
    delivering the drawn fuel to a port injector positioned external to the housing.

10. The method of claim 9, further comprising, delivering fuel from the high pressure fuel rail to the housing via a higher pressure fuel line, wherein the fuel pump is an engine driven high pressure displacement pump.

11. The method of claim 10, wherein fuel is delivered from the housing to the port injector via a lower pressure fuel line, the lower pressure fuel line coupled to the higher pressure fuel line via the pressure regulator.

12. The method of claim 10, wherein the flow selection valve is a mechanical spill valve, and wherein fuel is delivered from the housing to the port injector via a lower pressure fuel line, the lower pressure fuel line coupled to the higher pressure fuel line via the mechanical spill valve.

13. The method of claim 10, wherein delivering the drawn fuel includes moving delivery of a port injection fuel pulse from an initial timing corresponding to a closed intake valve injection to a first average pressure crossing of fuel rail pressure in an advanced direction, the first average pressure crossing including a zero pressure crossing.

14. The method of claim 13, further comprising, in response to the port injection fuel pulse, adjusting a direct injection fuel pulse by one or more of extending an end of injection timing of the direct injection fuel pulse and increasing an amount of direct injected fuel delivered in an intake stroke relative to a compression stroke.

15. A system, comprising:
    an engine with a cylinder;
    a high pressure fuel rail receiving fuel from an engine-driven high pressure fuel pump;
    a fuel distributing injection system (FDI) including each of a direct injector, a flow selection valve, and a pressure regulator located within a common housing, the direct injector configured to inject fuel directly into the cylinder, the common housing arranged downstream of the high pressure fuel rail;
    a port injector configured to inject fuel into an intake port of the cylinder, the port injector receiving fuel from the high pressure fuel rail via the fuel distributing injection system, the port injector positioned external to the common housing.

16. The system of claim 15, wherein the pressure regulator reduces a pressure of fuel received from the high pressure fuel rail before supplying the fuel to the port injector.

17. The system of claim 14, further comprising a controller configured with computer-readable instructions stored on non-transitory memory for: in response to a port injection fuel pulse command, adjusting a position of the flow control valve to direct fuel from downstream of the high pressure fuel rail and upstream of the direct injector to the port injector via the pressure regulator.

18. The system of claim 17, wherein the controller includes further instructions for: in response to the port injection fuel pulse command, moving a port injection timing from an initial injection timing corresponding to closed intake valve injection to a first zero-crossing of pressure in the high pressure fuel rail; and in response to a further direct injection fuel pulse command, adjusting a timing and split ratio of fuel delivered via direct injection in the intake stroke relative to a compression stroke, the adjusting based on the moving of the port injection timing.

\* \* \* \* \*